(12) United States Patent
Zhang

(10) Patent No.: US 11,589,073 B2
(45) Date of Patent: Feb. 21, 2023

(54) METHOD AND DEVICE FOR PROCESSING VIDEO IMAGE

(71) Applicant: Tencent Technology (Shenzhen) Company Limited, Shenzhen (CN)

(72) Inventor: Hongshun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/168,086

(22) Filed: Feb. 4, 2021

(65) Prior Publication Data

US 2021/0235113 A1 Jul. 29, 2021

Related U.S. Application Data

(63) Continuation of application No. 16/657,226, filed on Oct. 18, 2019, now Pat. No. 10,944,985, which is a (Continued)

(30) Foreign Application Priority Data

Oct. 31, 2017 (CN) .......................... 201711050289.8

(51) Int. Cl.
*H04N 19/523* (2014.01)
*H04N 19/105* (2014.01)
(Continued)

(52) U.S. Cl.
CPC ......... *H04N 19/523* (2014.11); *H04N 19/105* (2014.11); *H04N 19/119* (2014.11); *H04N 19/567* (2014.11)

(58) Field of Classification Search
None
See application file for complete search history.

(56) References Cited

U.S. PATENT DOCUMENTS 6,757,330 B1 6/2004 Hsu
10,944,985 B2 * 3/2021 Zhang ................. H04N 19/533
(Continued)

FOREIGN PATENT DOCUMENTS

CN 101247523 A 8/2008
CN 102164283 A * 8/2011
(Continued)

OTHER PUBLICATIONS

Nisar, H. et al., "Fast and Efficient Fractional Pixel Motion Estimation for H.264/AVC Video Coding", 2009 16th IEEE International Conference on Image Processing (ICIP), IEEE, Feb. 17, 2010, pp. 1561-1564.
(Continued)

*Primary Examiner* — Lindsay J Uhl
(74) *Attorney, Agent, or Firm* — Morgan, Lewis & Bockius LLP

(57) ABSTRACT

Embodiments of the present disclosure disclose a video image processing method performed at a computing device, including: after performing deblocking and sample adaptive offset on a reconstructed coding tree unit within a target image frame, performing half pixel estimation on the coding tree unit of the target image frame to obtain an optimal half pixel location having a minimum rate distortion cost; dividing a surrounding area of the optimal half pixel location into four partitions; selecting, among the four partitions according to rate distortion costs respectively of four half pixel locations adjacent to the optimal half pixel location, a first partition used for quarter pixel estimation; performing quarter pixel estimation on the first partition according to the optimal half pixel location, to obtain an optimal quarter pixel location having a minimum rate distortion cost within the first partition; and performing motion compensation to the target image frame by using at least one of the optimal half
(Continued)

pixel location and the optimal quarter pixel location as a motion estimation result.

17 Claims, 8 Drawing Sheets

Related U.S. Application Data continuation of application No. PCT/CN2018/104073, filed on Sep. 5, 2018.

(51) Int. Cl.
*H04N 19/119* (2014.01)
*H04N 19/567* (2014.01)

(56) References Cited

U.S. PATENT DOCUMENTS

| | | | |
|---|---|---|---|
| 2007/0217515 A1 | 9/2007 | Wang et al. | |
| 2016/0191946 A1 | 6/2016 | Zhou et al. | |
| 2018/0324437 A1* | 11/2018 | Kim | H04N 19/139 |

FOREIGN PATENT DOCUMENTS

| | | | |
|---|---|---|---|
| CN | 102164283 | A | 8/2011 |
| CN | 104378642 | A | 2/2015 |
| JP | 2006254349 | A | 9/2006 |
| JP | 2009213173 | A | 9/2009 |

OTHER PUBLICATIONS

Tencent Technology, ISRWO, PCT/CN2018/104073, Nov. 27, 2018, 7 pgs.

Tencent Technology, IPRP, PCT/CN2018/104073, May 5, 2020, 6 pgs.

Zhou, W. et al., "A Fast Hierarchical ¼-pel Fractional Pixel Motion Estimation Algorithm of H.264/AVC Video Coding," 2013 IEEE 8th Conference on Industrial Electronics and Applications (ICIEA), IEEE, Jul. 25, 2013, pp. 891-895.

Extended European Search Report, EP18873854.6, dated Jun. 18, 2021, 11 pgs.

Humaira Nisar et al., "Fast Block Motion Estimation Algorithm Based on Motion Classification and Directional Search Patterns", Optical Engineering, Gwangju Institute of Science and Technology Signal and Image Processing Laboratory, School of Information and Mechatronics, Gwangiu, Korea, vol. 47, No. 10, Oct. 1, 2008, XP055810600, ISSN: 0091-3286, 10 pgs.

Kexiang Liu et al., "A Novel Fast Motion Estimation Algorithm Based on Block-Matching", Cross Strait Quad-Regional Radio Science and Wireless Technology Conference (CSQRWC), IEEE, Jul. 26, 2011, XP032459668, ISBN: 978-1-4244-9792-8, 4 pgs.

Yao Nie et al., "Adaptive Rood Pattern Search for Fast Block-Matching Motion Estimation", IEEE Transactions on Image Processing, IEEE Service Center, Piscataway, NJ, vol. 11, No. 12, Dec. 1, 2002, XP011074339, ISSN: 1057-7149, 8 pgs.

* cited by examiner

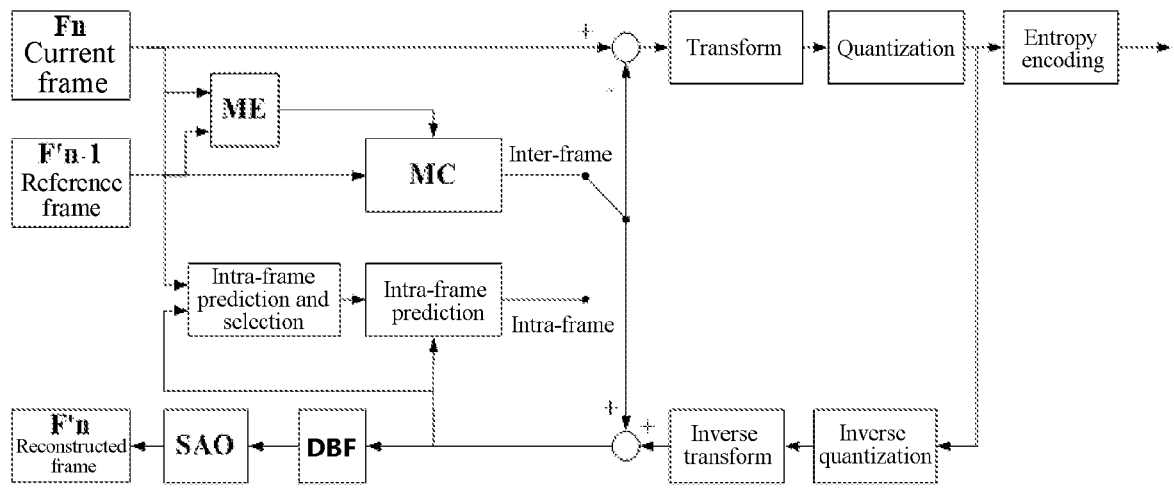
FIG. 2
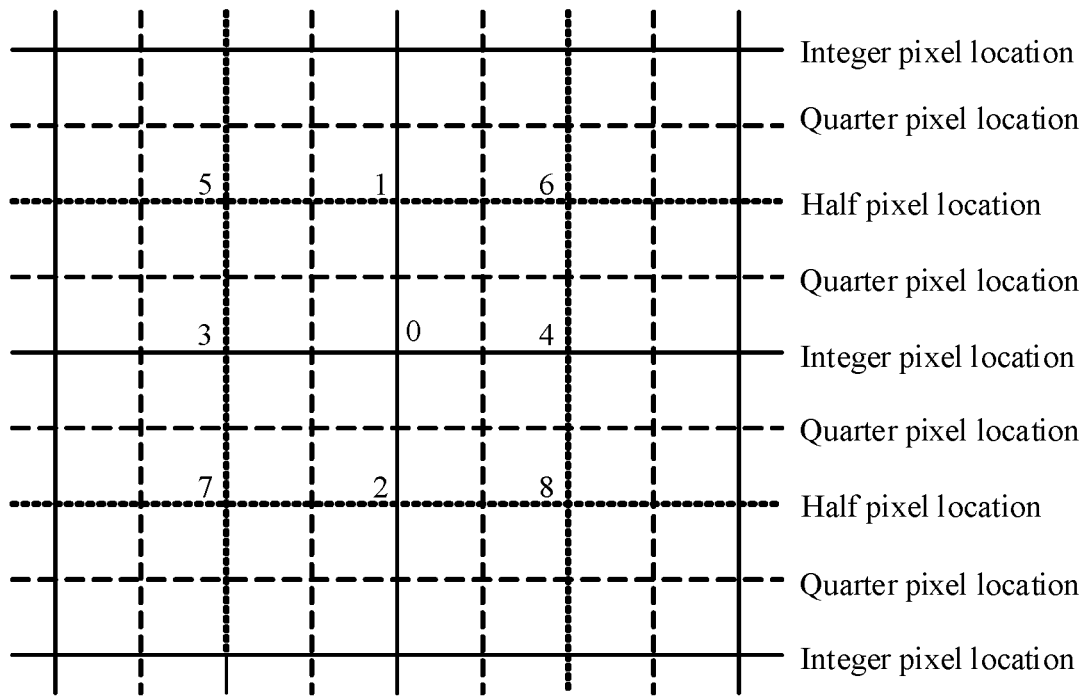
FIG. 3-a

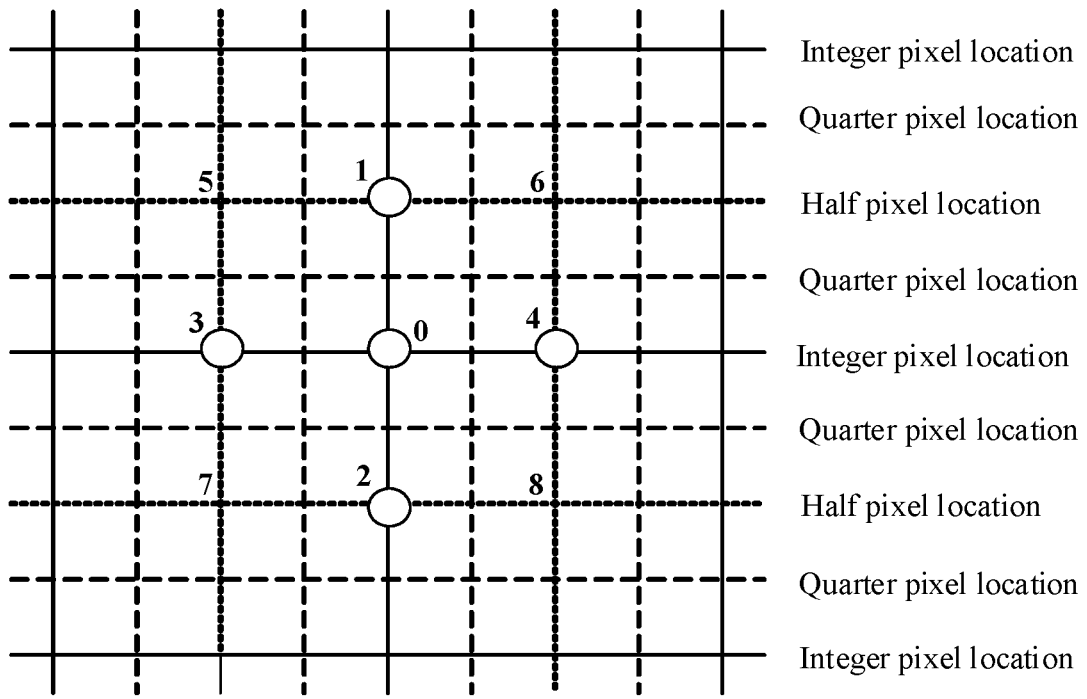
FIG. 3-b
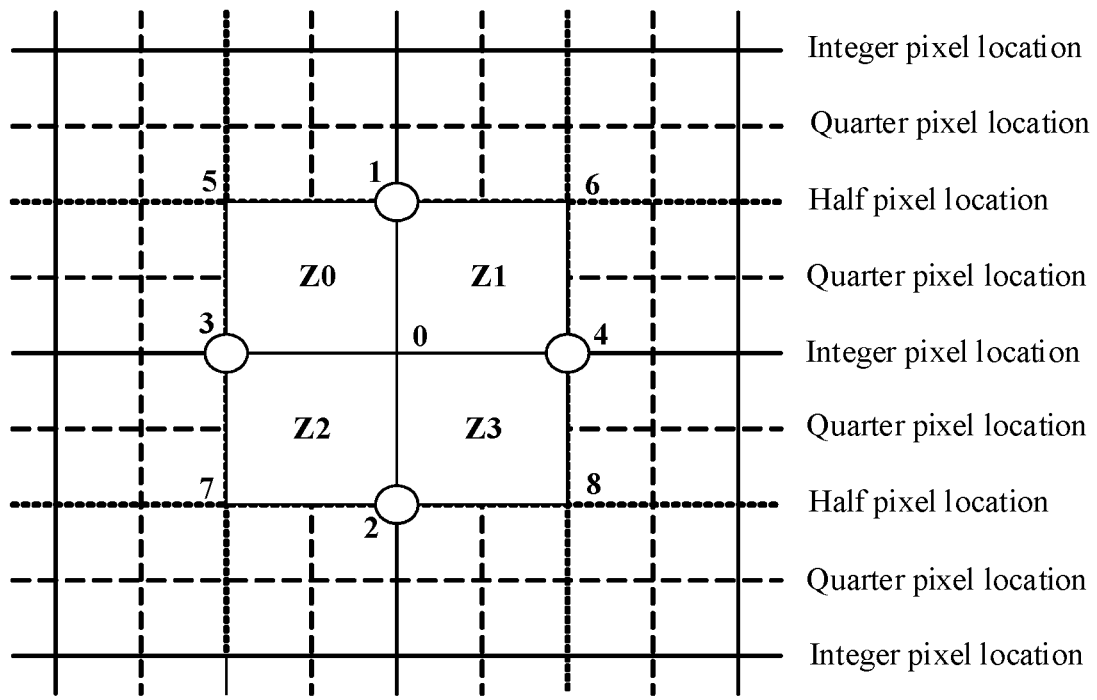
FIG. 3-c

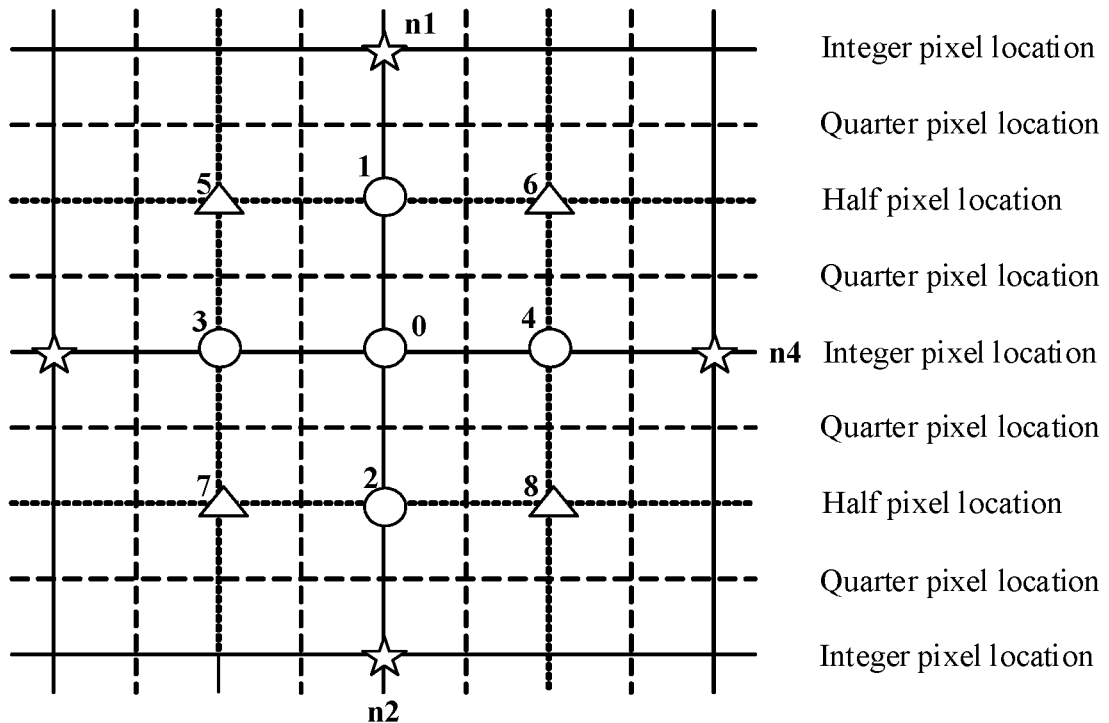
FIG. 3-d
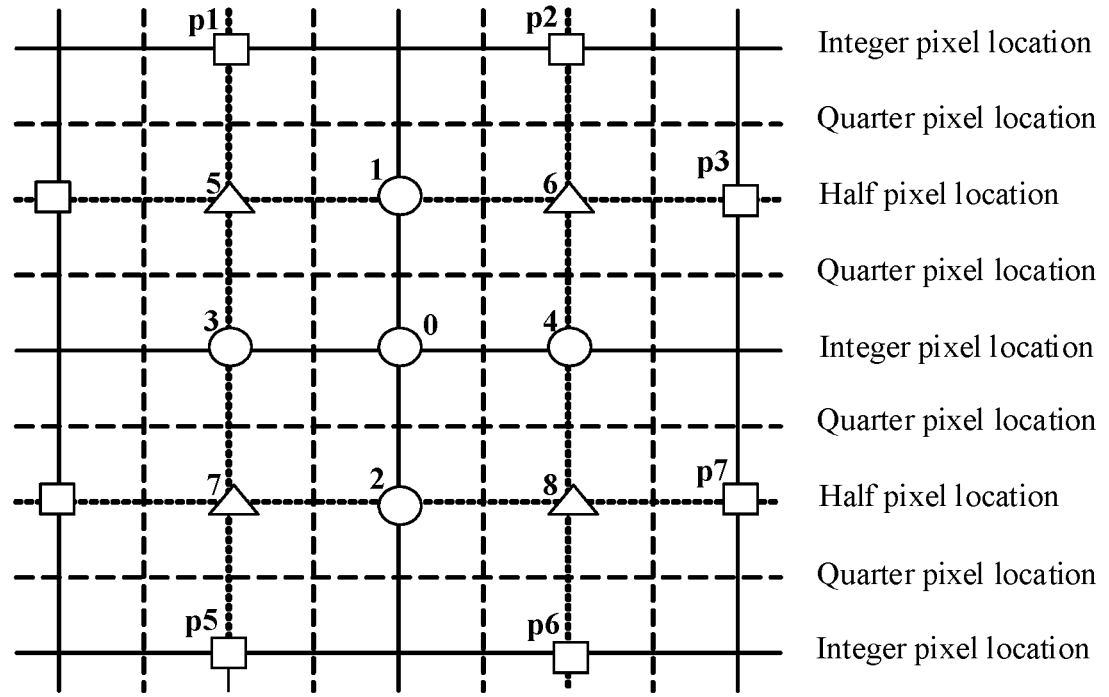
FIG. 3-e

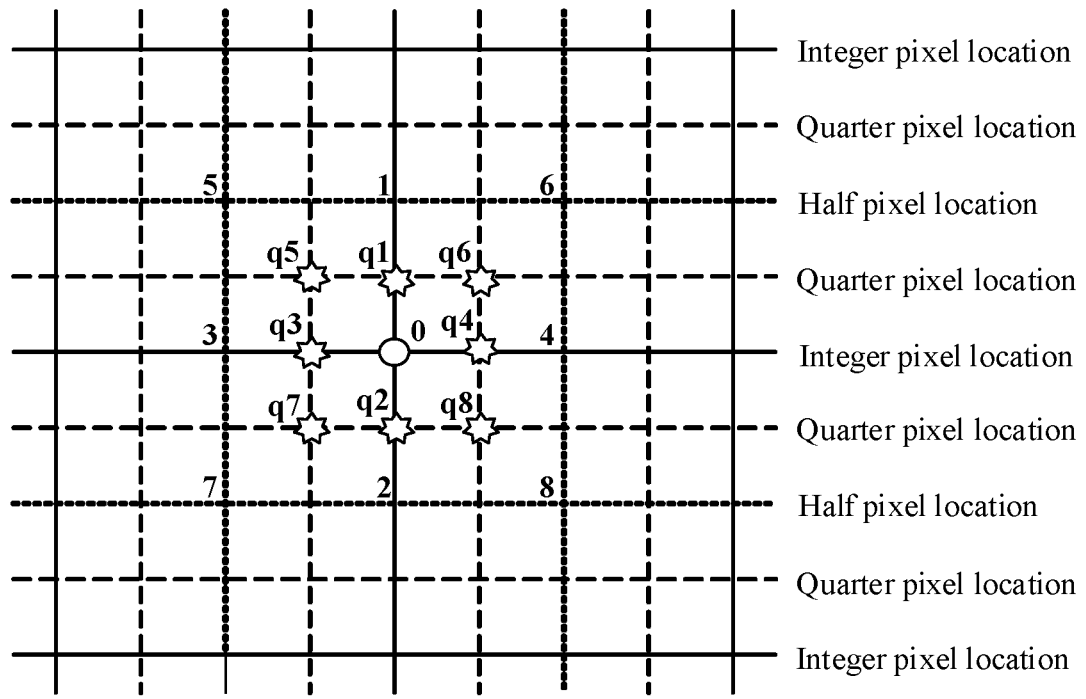
FIG. 3-f
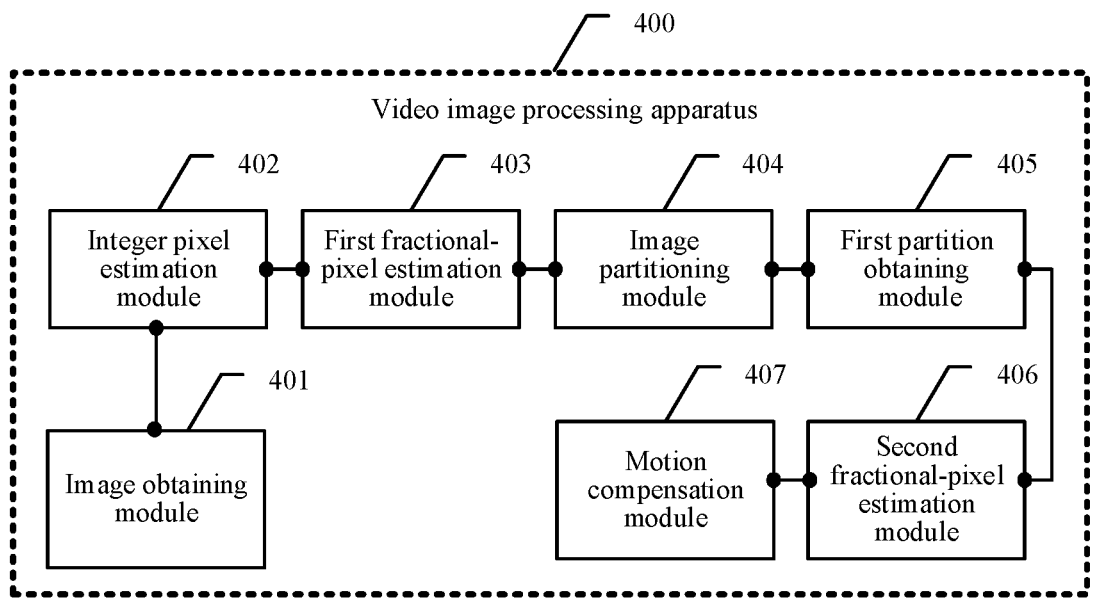
FIG. 4-a

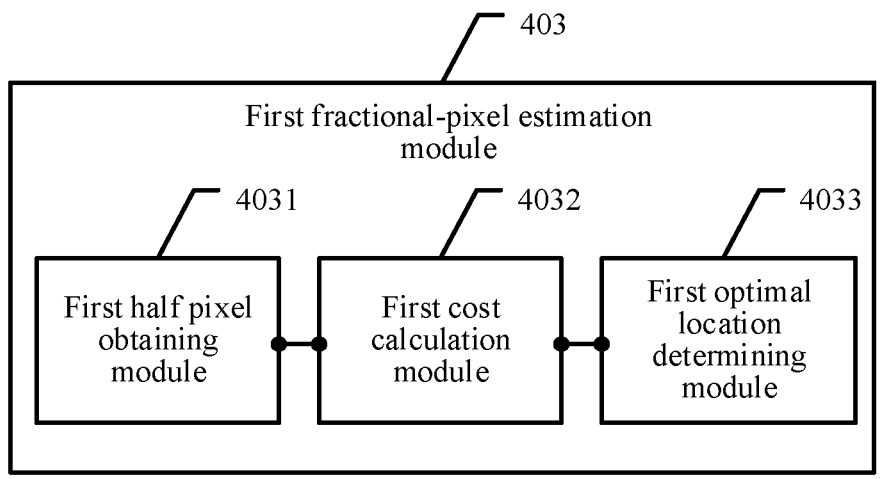
FIG. 4-b
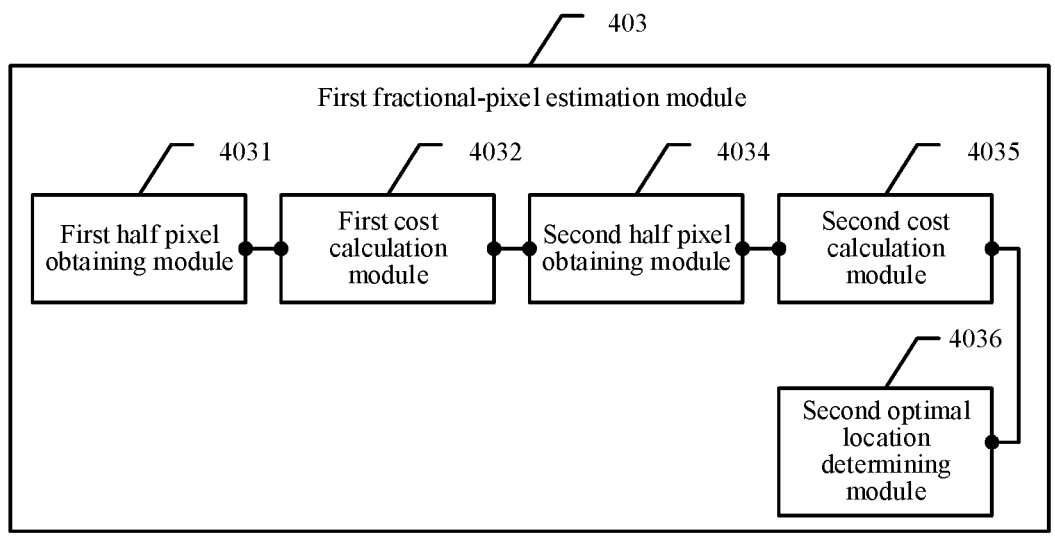
FIG. 4-c

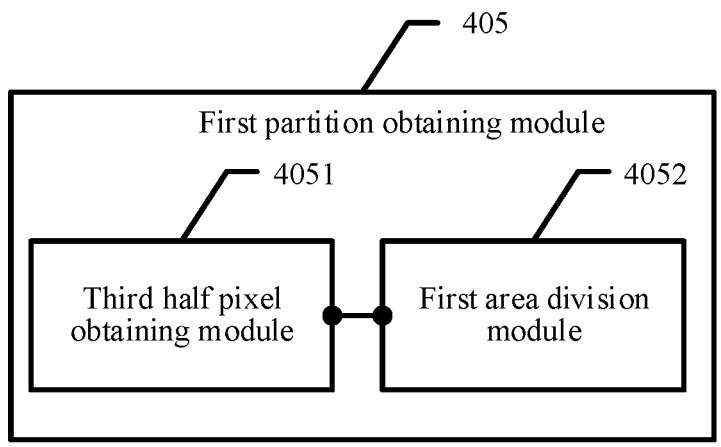
FIG. 4-d
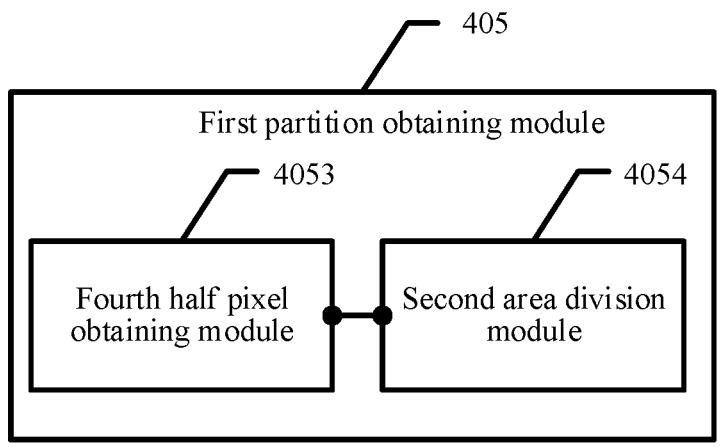
FIG. 4-e
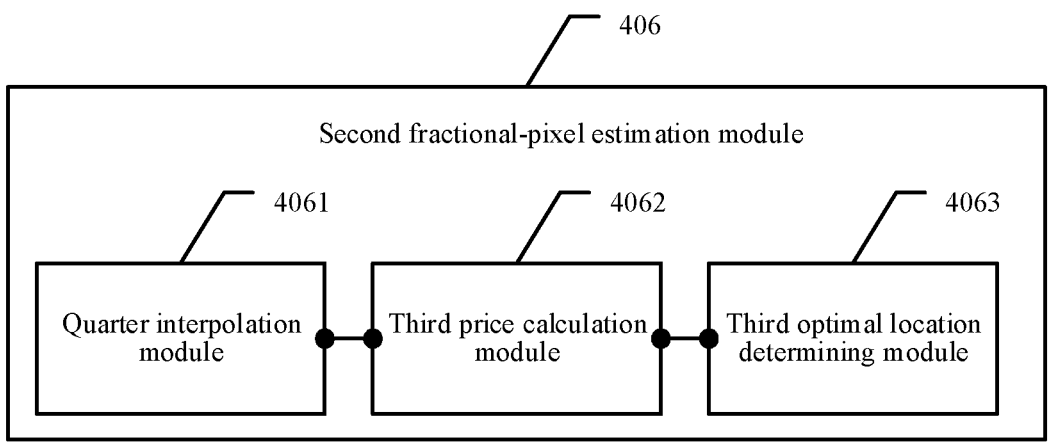
FIG. 4-f

METHOD AND DEVICE FOR PROCESSING VIDEO IMAGE

CROSS-REFERENCE TO RELATED APPLICATION

This application is a continuation application of U.S. patent application Ser. No. 16/657,226, entitled "METHOD AND DEVICE FOR PROCESSING VIDEO IMAGE" filed on Oct. 18, 2019, which is a continuation application of PCT/CN2018/104073, entitled "VIDEO IMAGE PROCESSING METHOD AND APPARATUS" filed on Sep. 5, 2018, which claims priority to Chinese Patent Application No. 201711050289.8, filed with the State Intellectual Property Office of the People's Republic of China on Oct. 31, 2017, and entitled "VIDEO IMAGE PROCESSING METHOD AND APPARATUS", all of which are incorporated herein by reference in their entirety.

FIELD OF THE TECHNOLOGY

The present disclosure relates to the field of computer technologies, and in particular, to video image processing.

BACKGROUND OF THE DISCLOSURE

A current video compression technology develops rapidly, and a future video development trend is high definition, high frame rate, and high compression rate. A currently popular H.264 compression manner has certain limitations in compression principles and cannot adapt to future needs. Therefore, the high efficiency video coding (HEVC) protocol emerges as the times require. For example, an H.264 encoding unit can have only a block size of 16×16, but an HEVC encoding unit can have a plurality of block sizes such as 128×128, 64×64, and 8×8. In addition, there are nine intra-frame prediction directions of the H.264 encoding unit while there may be 35 intra-frame prediction methods of the HEVC encoding unit. In addition, for an inter-frame segmentation mode, the H.264 encoding unit can use only a rectangular segmentation manner, while the HEVC encoding unit may also use an asymmetric segmentation manner. On the whole, a compression rate of the HEVC encoding unit may be improved by 40% compared with a compression rate of the H.264 encoding unit.

In current HEVC coding, interpolation needs to be first performed according to an integer pixel, to obtain a reference pixel at a corresponding location. Therefore, more matching pixels indicates a larger quantity of times of interpolation. Therefore, the HEVC encoding protocol has a high requirement for performance of a machine, and a common machine cannot have a real-time encoding capability. In this way, video compression performance is necessarily lowered.

SUMMARY

In view of the above, embodiments of the present disclosure provide a video image processing method and apparatus, to improve processing efficiency.

To achieve the foregoing objective, the embodiments of the present disclosure provide the following technical solutions:

According to one aspect, an embodiment of the present disclosure provides a video image processing method, performed at a computing device having one or more processors and memory storing programs to be executed by the one or more processors, the method comprising:

obtaining a target image frame from a to-be-encoded video image and selecting a coding tree unit including a predefined integer pixel location in the target image frame, wherein the coding tree unit has been reconstructed;

after performing deblocking and sample adaptive offset on the reconstructed coding tree unit:

performing half pixel estimation on the coding tree unit of the target image frame including the predefined integer pixel location, to obtain an optimal half pixel location having a minimum rate distortion cost within the coding tree unit of the target image frame;

dividing a surrounding area of the optimal half pixel location into four partitions;

selecting, among the four partitions according to rate distortion costs respectively corresponding to four half pixel locations adjacent to the optimal half pixel location, a first partition used for quarter pixel estimation;

performing quarter pixel estimation on the first partition according to the optimal half pixel location, to obtain an optimal quarter pixel location having a minimum rate distortion cost within the first partition; and performing motion compensation to the target image frame by using at least one of the optimal half pixel location and the optimal quarter pixel location as a motion estimation result.

According to another aspect, an embodiment of the present disclosure further provides a computing device, comprising: one or more processors; memory coupled to the one or more processors; and a plurality of program instructions stored thereon, which when executed by the one or more processors cause the processors to perform the aforementioned video image processing method.

According to still another aspect, an embodiment of the present disclosure provides a non-transitory computer-readable medium having instructions stored thereon that, when executed by a computing device having one or more processors, cause the computing device to perform the aforementioned video image processing method.

According to the foregoing technical solutions, it can be learned that the embodiments of the present disclosure have the following advantages:

In the embodiments of the present disclosure, because the quarter pixel estimation in the embodiments of the present disclosure is completed in the first partition according to the optimal location obtained through the half pixel estimation, and the first partition is a partition to which a location corresponding to the smallest rate distortion cost belongs, quarter interpolation does not need to be performed in all areas during the quarter pixel estimation, and a smallest rate distortion cost of each quarter pixel location in all the areas does not need to be calculated, provided that smallest rate distortion costs of quarter pixel locations in the first partition need to be calculated. Therefore, an encoding speed can be effectively improved when video compression performance is ensured, and calculation complexity can be lowered, to lower a requirement of video compression real-time encoding for machine performance.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings.

FIG. 2 is a schematic structural composition diagram of an HEVC encoding framework according to an embodiment of the present disclosure.

FIG. 3-a is a schematic diagram of an identifier of a relationship between a central point location and surrounding locations in a half motion estimation process according to an embodiment of the present disclosure.

FIG. 3-b is a schematic diagram of location identifiers of calculation points in a half motion estimation process according to an embodiment of the present disclosure.

FIG. 3-c is a schematic diagram of identifiers of partitions of four blocks when a central point location is an optimal location according to an embodiment of the present disclosure.

FIG. 3-d is a schematic diagram of point supplemented location identifiers when an optimal location in a half motion estimation process is first four locations according to an embodiment of the present disclosure.

FIG. 3-e is a schematic diagram of point supplemented location identifiers when an optimal location in a half motion estimation process is not first four locations according to an embodiment of the present disclosure.

FIG. 3-f is a schematic diagram of an identifier of a relationship between a central point location and surrounding locations before quarter motion estimation according to an embodiment of the present disclosure.

FIG. 4-a is a schematic structural composition diagram of a video image processing apparatus according to an embodiment of the present disclosure.

FIG. 4-b is a schematic structural composition diagram of a first fractional-pixel estimation module according to an embodiment of the present disclosure.

FIG. 4-c is a schematic structural composition diagram of another first fractional-pixel estimation module according to an embodiment of the present disclosure.

FIG. 4-d is a schematic structural composition diagram of a first partition obtaining module according to an embodiment of the present disclosure.

FIG. 4-e is a schematic structural composition diagram of another first partition obtaining module according to an embodiment of the present disclosure.

FIG. 4-f is a schematic structural composition diagram of a second fractional-pixel estimation module according to an embodiment of the present disclosure.

DESCRIPTION OF EMBODIMENTS

Embodiments of the present disclosure provide a video image processing method and apparatus, to improve an encoding speed as well as ensuring video compression performance, and lower calculation complexity.

To make the objectives, features, and advantages of the present disclosure clearer and more comprehensible, the following clearly and completely describes the technical solutions in the embodiments of the present disclosure with reference to the accompanying drawings in the embodiments of the present disclosure. Apparently, the described embodiments in the following description are merely some of the embodiments of the present disclosure rather than all of the embodiments. All other embodiments obtained by a person skilled in the art based on the embodiments of the present disclosure shall fall within the protection scope of the present disclosure.

The terms "include", "contain" and any other variants thereof in the specification, claims, and accompanying drawings of the present disclosure are intended to cover a non-exclusive inclusion, so that a process, a method, a system, a product, or a device that includes a series of units is not necessarily limited to those units, but may include other units not expressly listed or inherent to such a process, method, product, or device.

Detailed descriptions are separately provided below.

A video image processing method provided in the embodiments of the present disclosure may be applied to a video processing device. The video processing device may be a central processing unit (CPU) or a graphic processing unit (GPU) having a video processing capability. Optionally, the video processing device may be selected from terminals such as a mobile phone and a notebook terminal or may be selected from a server.

Figure 1:
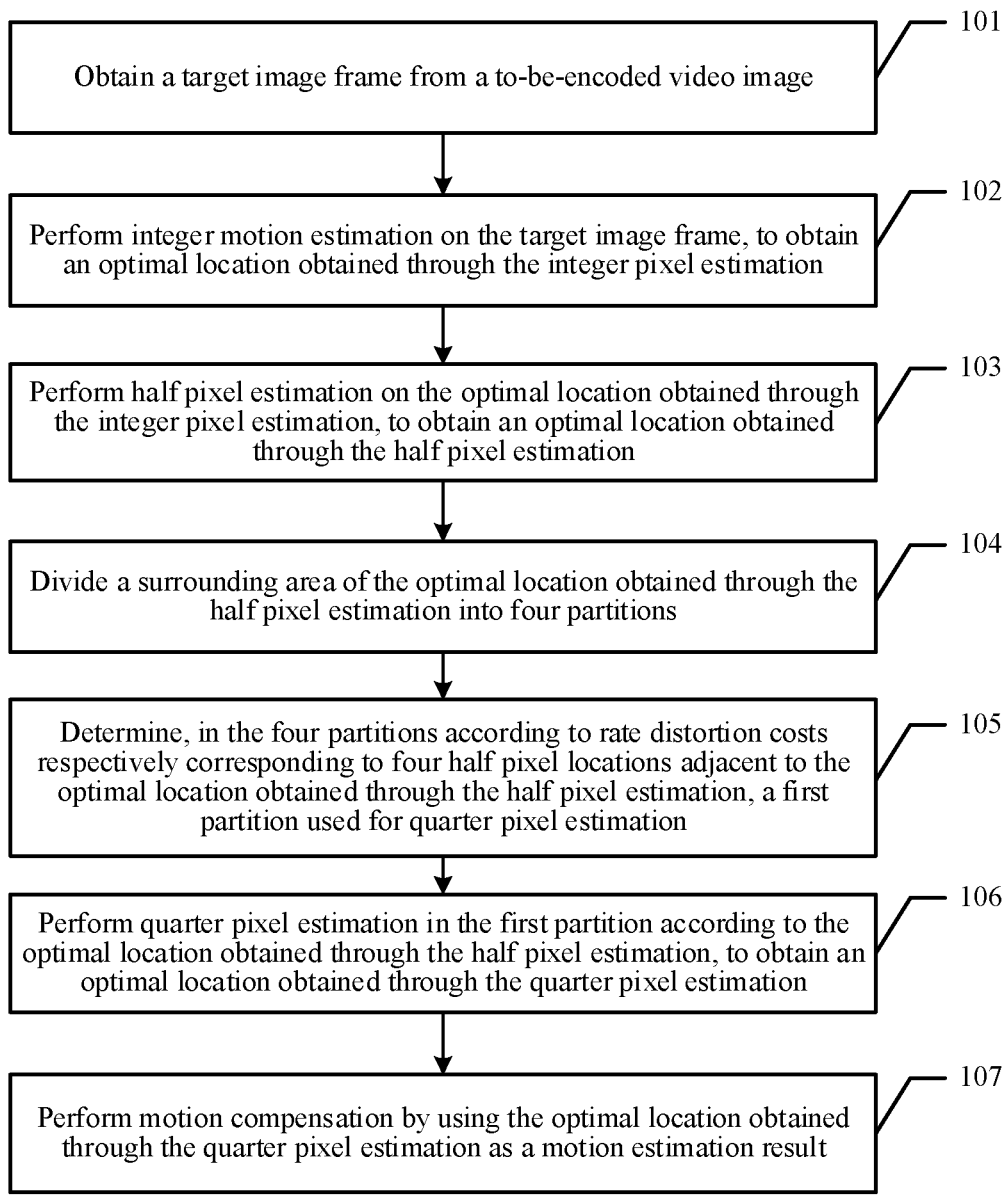
FIG. 1 is a schematic block flowchart of a video image processing method according to an embodiment of the present invention.

An example of the video image processing method in the present disclosure may be specifically applied to fast fractional pixel motion estimation and motion compensation. For example, in HEVC coding provided in this embodiment of the present disclosure, motion estimation (ME) may include the following three components: integer motion estimation, half motion estimation (HME), and quarter motion estimation (QME). In HME and QME, because an image has integer pixel accuracy, to improve a compression rate, each pixel needs to be first magnified by four times, and then an optimal matching location is searched for. An image that is magnified twice is needed for HME, and an image that is magnified by four times is needed for QME. The data does not exist. Therefore, interpolation needs to be first performed according to an integer pixel, to obtain a reference pixel at a corresponding location. In this embodiment of the present disclosure, half motion estimation and quarter motion estimation are not independent of each other, but an interpolation range is reduced based on half motion estimation, and then quarter pixel estimation is performed, to improve an encoding speed and lower calculation complexity. Referring to FIG. 1, a video image processing method provided by an embodiment of the present disclosure may include the following steps:

101: Obtain a target image frame from a to-be-encoded video image and select a predefined integer pixel location in the target image frame.

In this embodiment of the present disclosure, motion estimation may be performed on an image frame based on an HEVC encoding framework. A target image frame is first extracted. For example, the target image frame may be read from a frame buffer. The frame buffer is a display buffer, and writing a particular format of data into the display buffer means outputting content to a screen. The frame buffer may be located at any location of a system memory (an internal memory), and a video controller refreshes the screen by accessing the frame buffer. The frame buffer has an address in the internal memory.

102: Perform integer motion estimation on a predefined region of the target image frame including the predefined integer pixel location, to obtain an optimal location obtained through the integer pixel estimation.

In this embodiment of the present disclosure, after the target image frame is extracted, integer motion estimation may be performed on the predefined region of the target image frame, to obtain the optimal location obtained through the integer pixel estimation. The optimal location is an integer pixel location that is selected from a plurality of integer pixel locations and that has a smallest rate distortion cost value. A rate distortion cost corresponding to each integer pixel location needs to be calculated in an integer pixel estimation process, and the integer pixel location corresponding to the smallest rate distortion cost is the optimal location obtained through the integer pixel estimation.

103: Perform half pixel estimation on the optimal location obtained through the integer pixel estimation, to obtain an optimal location obtained through the half pixel estimation.

In this embodiment of the present disclosure, after the integer motion estimation is completed in step 102, half pixel estimation is performed on the optimal location obtained through the integer pixel estimation in a target frame, to obtain the optimal location obtained through the half pixel estimation. The optimal location is a half pixel location that is selected from a plurality of half pixel locations and that has a smallest rate distortion cost value. A rate distortion cost corresponding to each half pixel location needs to be calculated in an half pixel estimation process, and the half pixel location corresponding to the smallest rate distortion cost is the optimal location obtained through the half pixel estimation.

In some embodiments of the present disclosure, to reduce a calculation amount brought by half interpolation, four location points may be selected for half interpolation. Specifically, step 103 of performing half pixel estimation on the optimal location obtained through the integer pixel estimation, to obtain an optimal location obtained through the half pixel estimation includes the following steps:

step A1: obtaining four half pixel locations adjacent to the optimal location obtained through the integer pixel estimation, the four half pixel locations being four pixel locations: directly above, directly below, directly on the left side of, and directly on the right side of the optimal location obtained through the integer pixel estimation;

step A2: obtaining a location corresponding to a first smallest rate distortion cost from the optimal location obtained through the integer pixel estimation and the four half pixel locations; and step A3: determining that the optimal location obtained through the half pixel estimation is the optimal location obtained through the integer pixel estimation in a case that the location corresponding to the first smallest rate distortion cost is the optimal location obtained through the integer pixel estimation.

In step A1 to step A3, first, half motion estimation by using the optimal location obtained through the integer pixel estimation as a central point location is used as an example. The four pixel locations may be determined directly above, directly below, directly on the left side of, and directly on the right side of the optimal location obtained through the integer pixel estimation, so that a result of performing half interpolation at four surrounding locations on the optimal location obtained through the integer pixel estimation may be obtained, and the interpolation result is parsed, to obtain the four half pixel locations adjacent to the optimal location obtained through the integer pixel estimation. Half interpolation means that a half pixel location is obtained by performing interpolation on the optimal location obtained through the integer pixel estimation. In step A2, rate distortion costs of the following five pixel locations need to be calculated: the optimal location obtained through the integer pixel estimation and the four half pixel locations. A location corresponding to the smallest rate distortion cost is selected from the five rate distortion costs. Because in this embodiment of the present disclosure, there is a plurality of processes of calculating rate distortion costs, the smallest rate distortion cost in step A2 is defined as "a first smallest rate distortion cost". In step A3, when a location corresponding to the first smallest rate distortion cost is the optimal location obtained through the integer pixel estimation, because the four half pixel locations obtained by performing interpolation on the optimal location obtained through the integer pixel estimation are already obtained in step A1, half interpolation on the optimal location obtained through the integer pixel estimation is completed. The optimal location obtained through the half pixel estimation is the optimal location obtained through the integer pixel estimation.

In some other embodiments of the present disclosure, step 103 of performing half pixel estimation on the optimal location obtained through the integer pixel estimation, to obtain an optimal location obtained through the half pixel estimation includes the following steps:

step A1: obtaining four half pixel locations adjacent to the optimal location obtained through the integer pixel estimation, the four half pixel locations being four pixel locations: directly above, directly below, directly on the left side of, and directly on the right side of the optimal location obtained through the integer pixel estimation;

step A2: obtaining a location corresponding to a first smallest rate distortion cost from the optimal location obtained through the integer pixel estimation and the four half pixel locations;

step A4: obtaining, in a case that the location corresponding to the first smallest rate distortion cost is a first half pixel location, two half pixel locations adjacent to the first half pixel location, the two half pixel locations adjacent to the first half pixel location and the first half pixel location being located in a same axial direction, and the first half pixel location being a half pixel location with a smallest rate distortion cost in the four half pixel locations;

step A5: obtaining a location corresponding to a second smallest rate distortion cost from the first half pixel location and the two half pixel locations adjacent to the first half pixel location; and step A6: determining, in a case that the location corresponding to the second smallest rate distortion cost is the first half pixel location, that the optimal location obtained through the half pixel estimation is the first half pixel location; or step A7: determining, in a case that the location corresponding to the second smallest rate distortion cost is a third half pixel location, that the optimal location obtained through the half pixel estimation is the third half pixel location, the third half pixel location being a half pixel location with a smaller rate distortion cost in the two half pixel locations adjacent to the first half pixel location.

In step A1, step A2, and step A4 to step A7, the four pixel locations may be determined directly above, directly below, directly on the left side of, and directly on the right side of the optimal location obtained through the integer pixel estimation, so that a result of performing half interpolation at four surrounding locations on the optimal location obtained through the integer pixel estimation is obtained, and the half interpolation result is parsed, to obtain the four half pixel locations adjacent to the optimal location obtained through the integer pixel estimation. Half interpolation means that a half pixel location is obtained by performing interpolation on the optimal location obtained through the integer pixel estimation. In step A2, rate distortion costs of the following five pixel locations need to be calculated: the optimal location obtained through the integer pixel estimation and the four half pixel locations. A location corresponding to the smallest rate distortion cost is selected from the five rate distortion costs. Because in this embodiment of the present disclosure, there are a plurality of processes of calculating rate distortion costs, the smallest rate distortion cost in step A2 is defined as "a first smallest rate distortion cost". When the location corresponding to the first smallest rate distortion cost is not the optimal location obtained through the integer pixel estimation, step A4 to step A7 may be triggered to be performed, and the optimal location obtained through the half pixel estimation is re-searched for.

In step A4, the half pixel location with the smallest rate distortion cost in the four half pixel locations is defined as "a first half pixel location", the two half pixel locations adjacent to the first half pixel location are obtained, and the two half pixel locations adjacent to the first half pixel location and the first half pixel location are located in the same axial direction. Therefore, the two half pixel locations obtained through interpolation and the first half pixel location may be located in an axial direction of a horizontal axis or a longitudinal axis. That is, the two half pixel locations obtained through interpolation are in a horizontal direction of the first half pixel location, or the two half pixel locations obtained through interpolation are in a vertical direction of the first half pixel location. After the half interpolation result is obtained in step A4, rate distortion costs of the following three pixel locations need to be calculated: the first half pixel location and the two half pixel locations adjacent to the first half pixel location. The location corresponding to the smallest rate distortion cost is selected from the calculated three rate distortion costs. Because in this embodiment of the present disclosure, there is a plurality of processes of calculating rate distortion costs, the smallest rate distortion cost in step A5 is defined as "a second smallest rate distortion cost". Therefore, according to different locations corresponding to the smallest rate distortion costs, step A6 or A7 is separately performed.

104: Divide a surrounding area of the optimal location obtained through the half pixel estimation into four partitions.

In this embodiment of the present disclosure, after the optimal location obtained through the half pixel estimation is determined in step 103, for the surrounding area of the optimal location obtained through the half pixel estimation, the surrounding area of the optimal location obtained through the half pixel estimation may be divided, through division of a horizontal axis direction and a longitudinal axis direction, into four partitions by using the optimal location obtained through the half pixel estimation as a central point. The surrounding area of the optimal location obtained through the half pixel estimation is quarter pixel locations in eight directions in total: upper, lower, left, right, upper left, upper right, lower left, and lower right by using the optimal location obtained through the half pixel estimation as a central point. It may be learned from the above that the half interpolation result may be obtained in a half pixel estimation process. Therefore, a half pixel location obtained through half interpolation may be included in each partition.

In some embodiments of the present disclosure, in the foregoing implementation scenario of performing step A1 to step A3, step 104 of dividing a surrounding area of the optimal location obtained through the half pixel estimation into four partitions includes the following step:

B 1: dividing a surrounding area of the optimal location obtained through the integer pixel estimation into four partitions in a case that the location corresponding to the first smallest rate distortion cost is the optimal location obtained through the integer pixel estimation, each partition being obtained from an area divided by the optimal location obtained through the integer pixel estimation and two half pixel locations of the four half pixel locations.

When the location corresponding to the first smallest rate distortion cost is the optimal location obtained through the integer pixel estimation, it is determined that the optimal location obtained through the half pixel estimation is the optimal location obtained through the integer pixel estimation. Four partitions may be obtained through division around the optimal location obtained through the integer pixel estimation. In the half interpolation result is obtained in step A1, the four half pixel locations are obtained through interpolation. Therefore, an area may be divided by two half pixel locations of the four half pixel locations and a first central point area, and the divided area may be defined as a separate partition.

In some embodiments of the present disclosure, in the foregoing implementation scenario of performing step A1, step A2, and step A4 to step A6, step 104 of dividing a surrounding area of the optimal location obtained through the half pixel estimation into four partitions includes the following steps:

C1: obtaining, in a case that the location corresponding to the second smallest rate distortion cost is the first half pixel location, a second half pixel location adjacent to the first half pixel location, the second half pixel location being a pixel location on which no half interpolation is performed and that is in four pixel locations: directly above, directly below, directly on the left side of, and directly on the right side of the first half pixel location; and C2: dividing a surrounding area of the first half pixel location into four partitions, each partition being obtained from an area divided by the first half pixel location, the optimal location obtained through the integer pixel estimation, the two half pixel locations adjacent to the first half pixel location, and the second half pixel location.

When the location corresponding to the second smallest rate distortion cost is the first half pixel location, it is determined that the optimal location obtained through the half pixel estimation is the first half pixel location, and interpolation on only three pixel locations of the four pixel locations: directly above, directly below, directly on the left side of, and directly on the right side of the first half pixel location is completed. In this case, the second half pixel location adjacent to the first half pixel location needs to be obtained. In the following, the surrounding area of the first half pixel location is divided into four partitions. In step A4, when the half interpolation result is obtained in step C1, the four half pixel locations: the optimal location obtained through the integer pixel estimation, the two half pixel locations adjacent to the first half pixel location, and the second half pixel location are obtained through interpolation. An area may be divided by the two half pixel locations of the four half pixel locations and the first central point area, and the divided area may be defined as a separate partition.

In some embodiments of the present disclosure, in the foregoing implementation scenario of performing step A1, step A2, step A4, step A5, and step A7, step 104 of dividing a surrounding area of the optimal location obtained through the half pixel estimation into four partitions includes the following steps:

D1: obtaining, in a case that the location corresponding to the second smallest rate distortion cost is the third half pixel location, two fourth half pixel locations adjacent to the third half pixel location, the two fourth half pixel locations being pixel locations on which no interpolation is performed and that are in four pixel locations: directly above, directly below, directly on the left side of, and directly on the right side of the third half pixel location; and D2: dividing a surrounding area of the third half pixel location into four partitions, each partition being obtained from an area divided by the third half pixel location, two pixel locations that are adjacent to the third half pixel location and that are in the four half pixel locations, and the two fourth half pixel locations.

The half pixel location with the smallest rate distortion cost in the two half pixel locations adjacent to the first half pixel location is defined as "a third half pixel location". When the location corresponding to the second smallest rate distortion cost is the third half pixel location, interpolation on only two pixel locations of the four pixel locations: directly above, directly below, directly on the left side of, and directly on the right side of the third half pixel location is completed. In this case, the two fourth half pixel locations adjacent to the third half pixel location need to be obtained. In the following, the surrounding area of the third half pixel location is divided into four partitions. In step A4, when the half interpolation result is obtained in step D1, the four half pixel locations: the two pixel locations that are adjacent to the third half pixel location and that are in the four half pixel locations and the two fourth half pixel locations are obtained through interpolation. An area may be divided by the two half pixel locations of the four half pixel locations and the first central point area, and the divided area may be defined as a separate partition.

105: Determine, in the four partitions according to rate distortion costs respectively corresponding to four half pixel locations adjacent to the optimal location obtained through the half pixel estimation, a first partition used for quarter pixel estimation.

In this embodiment of the present disclosure, in step 104, the surrounding area of the optimal location obtained through the half pixel estimation is divided into four partitions. Each partition includes two quarter pixel locations obtained through quarter interpolation. Therefore, each of the four partitions has two quarter pixel locations. For each half pixel location in the four partitions, a rate distortion cost may be calculated. A smallest rate distortion cost is selected from the four rate distortion costs. The partition to which the location corresponding to the smallest rate distortion cost belongs is the first partition. Because in this embodiment of the present disclosure, when half motion estimation is performed, when quarter motion estimation is determined according to costs of four surrounding pixels, interpolation needs to be performed only on a location point in the first partition. Therefore, an interpolation range of the quarter motion estimation is greatly reduced. Therefore, an encoding speed can be improved, and calculation complexity can be lowered.

In some embodiments of the present disclosure, step 105 of determining, in the four partitions according to rate distortion costs respectively corresponding to four half pixel locations adjacent to the optimal location obtained through the half pixel estimation, a first partition used for quarter pixel estimation includes the following steps:

determining four half pixel locations: directly above, directly below, directly on the left side of, and directly on the right side of the optimal location obtained through the half pixel estimation as the four half pixel locations adjacent to the optimal location obtained through the half pixel estimation;

calculating rate distortion costs corresponding to the four half pixel locations adjacent to the optimal location obtained through the half pixel estimation; and determining the first partition according to a value magnitude relationship between a rate distortion cost corresponding to a half pixel location directly above the optimal location and a rate distortion cost corresponding to a half pixel location directly below the optimal location and a value magnitude relationship between a rate distortion cost corresponding to a half pixel location directly on the left side of the optimal location and a rate distortion cost corresponding to a half pixel location directly on the right side of the optimal location.

Descriptions are provided below by way of example. The surrounding area of the optimal location obtained through the half pixel estimation is divided into: an upper right area, an upper left area, a lower right area, and a lower left area. Values of the rate distortion costs respectively corresponding to the half pixel location directly above the optimal location and the half pixel location directly below the optimal location are compared, and values of the rate distortion costs respectively corresponding to the half pixel location directly on the left side of the optimal location and the half pixel location directly on the right side of the optimal location are compared. If the rate distortion cost corresponding to the half pixel location directly above the optimal location is less than or equal to the rate distortion cost corresponding to the half pixel location directly below the optimal location, and the rate distortion cost corresponding to the half pixel location directly on the left side of the optimal location is less than or equal to the rate distortion cost corresponding to the half pixel location directly on the right side of the optimal location, it is determined that the first partition is the upper left area. If the rate distortion cost corresponding to the half pixel location directly above the optimal location is less than or equal to the rate distortion cost corresponding to the half pixel location directly below the optimal location, and the rate distortion cost corresponding to the half pixel location directly on the left side of the optimal location is greater than the rate distortion cost corresponding to the half pixel location directly on the right side of the optimal location, it is determined that the first partition is the upper right area. If the rate distortion cost corresponding to the half pixel location directly above the optimal location is greater than the rate distortion cost corresponding to the half pixel location directly below the optimal location, and the rate distortion cost corresponding to the half pixel location directly on the left side of the optimal location is less than or equal to the rate distortion cost corresponding to the half pixel location directly on the right side of the optimal location, it is determined that the first partition is the lower left area. If the rate distortion cost corresponding to the half pixel location directly above the optimal location is greater than the rate distortion cost corresponding to the half pixel location directly below the optimal location, and the rate distortion cost corresponding to the half pixel location directly on the left side of the optimal location is greater than the rate distortion cost corresponding to the half pixel location directly on the right side of the optimal location, it is determined that the first partition is the lower right area.

106: Perform quarter pixel estimation in the first partition according to the optimal location obtained through the half pixel estimation, to obtain an optimal location obtained through the quarter pixel estimation.

In this embodiment of the present disclosure, the optimal location obtained through the half pixel estimation and the first partition to which the location corresponding to the smallest rate distortion cost belongs are calculated in the foregoing steps. Therefore, when QME is performed in HEVC coding, the QME needs to performed only in the first partition rather than performing the QME in all area locations. Therefore, an interpolation range of quarter motion estimation is greatly reduced. Therefore, an encoding speed can be improved, and calculation complexity can be lowered.

In some embodiments of the present disclosure, step 106 of performing quarter pixel estimation in the first partition according to the optimal location obtained through the half pixel estimation, to obtain an optimal location obtained through the quarter pixel estimation includes the following steps:

E1: performing quarter interpolation at three surrounding locations in the first partition according to the optimal location obtained through the half pixel estimation, to obtain three quarter pixel locations adjacent to the optimal location obtained through the half pixel estimation, the three quarter pixel locations being located in the first partition;

E2: obtaining a location corresponding to a third smallest rate distortion cost from the optimal location obtained through the half pixel estimation and the three quarter pixel locations; and E3: determining that the location corresponding to the third smallest rate distortion cost is the optimal location obtained through the quarter pixel estimation.

In the foregoing implementation scenarios of step E1 to step E3, only quarter interpolation at three surrounding locations needs to be performed in the first partition, to obtain the three quarter pixel locations adjacent to the optimal location obtained through the half pixel estimation. The three quarter pixel locations are located in the first partition. After quarter interpolation is completed in step E1, rate distortion costs of the following four pixel locations: the optimal location obtained through the half pixel estimation and the three quarter pixel locations need to be calculated. The location corresponding to the smallest rate distortion cost is selected from the calculated four rate distortion costs. Because in this embodiment of the present disclosure, there is a plurality of processes of calculating rate distortion costs, the smallest rate distortion cost in step E2 is defined as "a third smallest rate distortion cost". At last, the location corresponding to the third smallest rate distortion cost may be the optimal location obtained through the quarter pixel estimation.

107: Perform motion compensation by using the optimal location obtained through the quarter pixel estimation as a motion estimation result.

In this embodiment of the present disclosure, after the optimal location obtained through the quarter pixel estimation is obtained in step 106, motion compensation may be performed based on the optimal location obtained through the quarter pixel estimation. For a motion compensation manner, refer to the related technology. Details are not described herein. After motion compensation is completed, prediction and encoding may be performed. Spatial correlation and time correlation of a video are mainly used to remote time-space domain redundancy information by means of intra-frame prediction and inter-frame prediction, to obtain a prediction image block. Then, a difference between the prediction image block and an original image block is obtained, to obtain a prediction residual block, then discrete cosine transform (DCT) and quantization are performed on the prediction residual block, to obtain a quantized DCT coefficient. At last, entropy encoding is performed on the quantized DCT coefficient, to obtain a compressed bitstream.

It may be learned from descriptions of the foregoing embodiments for the embodiments of the present disclosure that because the quarter pixel estimation in the embodiments of the present disclosure is completed in the first partition according to the optimal location obtained through the half pixel estimation, and the first partition is a partition to which a location corresponding to the smallest rate distortion cost belongs, quarter interpolation does not need to be performed in all areas during the quarter pixel estimation, and a smallest rate distortion cost of each quarter pixel location in all the areas does not need to be calculated, provided that smallest rate distortion costs of quarter pixel locations in the first partition need to be calculated. Therefore, an encoding speed can be effectively improved when video compression performance is ensured, and calculation complexity can be lowered, to lower a requirement of video compression real-time encoding for machine performance.

As shown in FIG. 2, FIG. 2 is a schematic structural composition diagram of an HEVC encoding framework according to an embodiment of the present disclosure. First, an HEVC encoding process is first described in detail. A frame of image is read from the frame buffer and then sent to an encoder, intra-frame or inter-frame prediction is performed, and then a prediction value is obtained. Intra-frame prediction means that a predicted pixel is obtained through interpolation by referring to a surrounding pixel, and information in spatial domain is referred to; inter-frame prediction means that a location most matching a target block is found from a reference frame, and information in time domain is referred to. The inter-frame prediction may include motion estimation (ME) and motion compensation (MC). After the prediction value is obtained, a difference between the prediction value and input data is obtained, to obtain a residue, then discrete cosine transform (DCT) transform and quantization are performed, to obtain a residual coefficient, then the residual coefficient is sent into an entropy encoding module, and a bitstream is outputted. In addition, after inverse quantization and inverse transform are performed on the residual coefficient, a residual value of a reconstructed image is obtained, and the residual value and an intra-frame or inter-frame prediction value are added, to obtain the reconstructed image. After in-loop filtering is performed on the reconstructed image, the reconstructed image enters a reference frame queue as a next frame of reference image, so that encoding is performed one frame by one frame. The in-loop filtering may include deblocking filter (DBF) and sample adaptive offset (SAO).

In HEVC coding, because segmentation is finer, and more directions are provided, a calculation amount is large. To achieve high compression performance, a whole encoder needs to be optimized. Generally, entropy encoding in inter-frame prediction and inter-frame parts takes up approximately 90% of the whole calculation amount, entropy encoding of intra-frame prediction and intra-frame parts takes up 8%, and SAO and DB take up less 1% in total. An ME part takes up 30% to 40% of the whole calculation mount, and the proportion is larger with optimization of other parts.

ME includes three parts: integer motion estimation, half motion estimation (HME), and quarter motion estimation (QME).

This embodiment of the present disclosure provides a solution of reducing a quantity of motion estimation points and not lowering compression performance, to improve an encoding speed and lower complexity of calculation, to lower a requirement of video compression real-time encoding for a machine.

In this embodiment of the present disclosure, the following three parts are included: encoder architecture adjustment, HME optimization, and QHE optimization. First, an interpolation part needed during fractional-pixel motion estimation is placed in a target block, data is processed through DB and SAO immediately after being reconstructed, reference pixels corresponding to all locations of half pixels and reference pixels at two locations in a half horizontal direction are obtained through interpolation, then inter-frame prediction half pixel estimation is performed directly according to an mv (motion vector) value, and when quarter motion estimation is performed, whether interpolation is performed is determined according to an mv status, avoiding repeated interpolation. In addition, when half motion estimation is performed, in which areas location points are performed during quarter motion estimation is determined according to costs of four surrounding pixels, and only three points are performed during final quarter pixel estimation to achieve compression performance of original eight points. In addition, a whole point supplementation strategy is designed during half motion estimation, four points are operated first, and then whether the process ends is determined, or other location points are supplemented.

In an encoder architecture shown in FIG. 2, after coding of all coding tree units (CTU) of an entire frame is completed, DB of the entire frame is performed, then SAO of the entire frame is performed, and a reference frame queue is entered at last. During fractional-pixel motion estimation, no reference pixel exists, interpolation is performed according to mv coordinates, that is, plug and play, a specific location is obtained through interpolation when the location is needed, and then an optimal mv location is obtained through calculation and comparison.

In this embodiment of the present disclosure, an interpolation part is processed after SAO, the following adjustment is made. After a CTU is encoded, DB and SAO immediately start to be performed, then all reference pixels at a half pixel location are obtained through interpolation, and interpolation is performed by using a CTU block as a unit, each location corresponding to an image buffer. During use, to which image buffer the location is corresponds is selected according to the half pixel location of the mv, and the location is offset to a corresponding location. In addition, two surfaces in a quarter pixel horizontal direction are obtained through interpolation. If a quarter pixel location of the mv is not a location in the horizontal direction on which interpolation is performed, interpolation is performed.

The following describes a process of optimizing HME in this embodiment of the present disclosure. As shown in FIG. 3-*a*, a central point and eight surrounding point locations may specifically include three pixel locations: integer pixel locations represented by solid lines, half pixel locations represented by dashed lines including dots, and quarter pixel locations represented by dashed lines including short line segments.

Half pixel estimation is obtained through interpolation in advance, and during use, is selected according to corresponding coordinates of the mv. Then, a location at which an optimal mv is located is judged according to a cost. For example, a rate distortion cost may be used for selecting the best of a plurality of options, and a corresponding value is referred to as a cost for short. An mv corresponding to a smallest cost is an optimal mv, and the cost is obtained by the following formula:

cost=satd(sum of absolute transformed differences)+ lamda*bit wherein bit presents bits corresponding to (mv-mvp).

SATD stands for Sum of Absolute Transformed Difference. Sum of Absolute Values after Hadamard transform is a manner for calculating distortion, is obtaining a sum of absolute values of elements after Hadamard transform is performed on a residual signal, and has high calculation amount accuracy compared with SAD. Lamda is a Lagrange constant. mvp stands for motion vector prediction. The value needs to be deduced according to the protocol. During actual coding, mvd (motion vector difference) is encoded, that is, mvd=mv-mvp. In this way, coding may be saved.

Half motion estimation mainly includes the following process:

Step 1: Calculate costs of a central point and four locations: up, down, left, and right, that is, locations 0, 1, 2, 3, and 4, as locations in which circles are located in FIG. 3-*b*.

Through comparison of cost values, a smallest cost value and a corresponding location are found.

Step 2: if a smallest cost is at a central location, that is, a point 0, end HME and compare costs corresponding to locations 1 and 2 and costs at locations 3 and 4, and divide an area encircled by coordinates 5, 6, 7, and 8 into four partitions by using the central point as a coordinate original point according to the following table, as shown in Table 1:

| Cost 1 is less than or equal to cost 2 | Cost 3 is less than or equal to cost 4 | Partition |
|---|---|---|
| Yes | Yes | 0 |
| Yes | No | 1 |
| No | Yes | 2 |
| No | No | 3 |

As shown in FIG. 3-*c*, the four partitions correspond to four partitions Z0, Z1, Z2, and Z3 in the figure. Three specific points on which quarter motion estimation is performed may be indicated by the partitions. All points are calculated if only the three points are calculated in probability. In this way, a quantity of quarter motion estimation points is reduced, and an encoding speed is improved.

If a location at which the smallest cost is located is not the central point, enter step 3.

Step 3: First supplementally operate two points according to a target optimal location (that is, after each location is calculated, a location corresponding to a smallest cost is obtained), supplement points according to the following rule, as shown in a location at which a triangle is located shown in FIG. 3-*d*:

If the smallest-cost location is the location 1, points 5 and 6 need to be supplementally operated;

If the smallest-cost location is the location 2, points 7 and 8 need to be supplementally operated;

If the smallest-cost location is the location 3, points 5 and 7 need to be supplementally operated; and If the smallest-cost location is the location 4, points 6 and 8 need to be supplementally operated.

In this embodiment of the present disclosure, at a half pixel location of the smallest-cost location, a location that is not operated and that is on the left of, on the right of, above, or below the target location is then selected, that is, a location that is not operated is supplemented. For example, for the location 1, locations 5, 6, and n1 need to be supplemented because 5 or 6 may be optimal, and the location n1 is not necessarily operated. Therefore, 5 and 6 need to be calculated. If the location 1 is still optimal, the location n1 is supplemented. Otherwise, point supplementation is performed according to step 5.

Then, cost values of the supplemented points are compared with the smallest-cost point. In this way, an optimal location is found. If the location corresponding to the smallest cost is not changed, one point is supplemented according to step 4, and comparison is performed. Otherwise, a new smallest-cost location is used as a center, and two points are supplemented according to step 5.

Step 4: first, supplement one point according to locations shown in FIG. 3-d, as shown in FIG. 3-d:

That is, if the smallest-cost location is the location 1, a point n1 needs to be supplementally operated;

If the smallest-cost location is the location 2, a point n2 needs to be supplementally operated;

If the smallest-cost location is the location 3, a point n3 needs to be supplementally operated; and If the smallest-cost location is the location 4, a point n4 needs to be supplementally operated.

When point supplementation is performed according to step 4, the smallest-cost location is the location 1, 2, 3, or 4, and the four locations are all half pixel locations.

Then, the location at which the smallest cost is located is used as a center, and to which partition of four areas the location belongs is determined according to step 2.

Step 5: Supplement two points according to locations shown in FIG. 3-e.

In FIG. 3-e, point supplemented location identifiers when an optimal location during half motion estimation is not first four locations are shown. An objective of point supplementation is to calculate four locations: above, below, on the left of, and on the right of the target optimal location and determine to which partitions the four locations belong, to prepare for guiding quarter motion estimation. Which point is supplemented specifically depends on which point is missing. For example, the target optimal location is 7, locations above and on the right of the location 7 are already calculated, but locations on the left of and below the location 7 are not calculated. Therefore, points p4 and p5 are supplemented.

If the smallest-cost location is the location 5, points p0 and p1 need to be supplementally operated, and corresponding coordinates are (−4, −2) and (−2,−4);

If the smallest-cost location is the location 6, points p2 and p3 need to be supplementally operated, and corresponding coordinates are (2,−4) and (4,−2);

If the smallest-cost location is the location 7, points p4 and p5 need to be supplementally operated, and corresponding coordinates are (−4,2) and (−2,4);

If the smallest-cost location is the location 8, points p6 and p7 need to be supplementally operated, and corresponding coordinates are (2,4) and (4,2).

The foregoing coordinates are relative to an optimal location after integer motion estimation, that is, an original point of half motion estimation. A location located above or on the left of the original point is minus, and a location located below or on the right of the original point is plus.

Then, the location at which the smallest cost is located is used as a center, and to which partition of four areas the location belongs is determined according to step 2.

All half motion estimation may be implemented through a whole loop described in step 1 to step 5.

QME optimization is performed in the following. At an optimal location during half pixel estimation, locations of eight surrounding quarter pixels, as shown in locations at which stars are located in FIG. 3-f, are determined, and a circle represents the optimal location obtained through half motion estimation.

Using an example in which the optimal location during half pixel estimation is the central point, by combining an identifier indicating which partition the location belongs obtained in HME, corresponding to each partition, only three points are operated during quarter motion estimation. That is, because the half pixel is operated, an optimal result of the quarter motion estimation and to which area the location belong s are already pre-determined, to implement point supplemented partitions.

If the location belongs to a zeroth partition, that is, z0, locations q5, q3, and q1 are operated;

If the location belongs to a first partition, that is, z1, locations q6, q1, and q4 are operated;

If the location belongs to a second partition, that is, z2, locations q7, q3, and q2 are operated; and If the location belongs to a third partition, that is, z3, locations q8, q2, and q4 are operated.

Then, comparison is performed. An my and cost corresponding to the smallest cost is an optimal my and an optimal cost. QME ends.

In this embodiment of the present disclosure, during inter-frame prediction, a pixel is read at a corresponding location of a reference frame according to the my. If there is a quarter pixel on which interpolation needs to be performed, a residue is calculated, and the like, and at last, the my is written into a bitstream. A decoding end obtains the my through decoding, then a pixel is read in a same manner, interpolation may also need to be performed, and a reconstructed image is obtained by adding residual data.

In this embodiment of the present disclosure, repeated interpolation is avoided. Many pixels are superposed during interpolation. For example, locations 5 and 6 in a half pixel differ in only a column of data, and remaining parts are the same. During interpolation, data of a target prediction block size is obtained through interpolation. A larger block indicates more superposition. In addition, when quarter pixel interpolation is performed, interpolation is performed based on the half pixel. In a plug-and-play manner, interpolation is performed again each time because a location is not determined. The half pixel is first obtained through interpolation, and then the quarter pixel is obtained through interpolation. In this embodiment of the present disclosure, interpolation is performed once at each location and is not repeated. In addition, quarter interpolation is performed based on an existing half pixel, and two locations are already operated. Because quarter interpolation is performed on few points, interpolation may be performed.

It may be learned from the foregoing examples that before optimization, half pixel estimation and quarter motion estimation are both performed on eight points, interpolation is used, and then motion searching is performed. In the solution of the embodiments of the present disclosure, during half motion estimation, four points are operated at a probability of 35%, seven points are operated at a probability of 40%, and eight points are operated at a probability of 25%. If the optimal location counted by the original manner of eight points is used, then probabilities of four points, seven points, and eight points are calculated. The four points means end after step 1 in HME is performed. The seven points means that the optimal location is the location 1, 2, 3, or 4, and three points need to be supplemented. The eight points means that step 5 is performed, and a calculation amount of 22.5% may be saved in calculation of the part. During the quarter motion estimation, only three points are operated, and a calculation amount of 62.5% may be saved in calculation of the part, and architecture adjustment is performed, avoiding repeated interpolation. A whole encoding speed is improved by 32.2%, and a compression performance index (bitrate distortion-rate, bd-rate) is reduced by only 0.24%. Therefore, yields are prominent.

For better understanding and implementation of the foregoing solutions of this embodiment of the present disclosure, the following makes a specific description by using a corresponding application scenario as an example.

For simple descriptions, the foregoing method embodiments are stated as a series of action combinations. However, a person skilled in the art should know that the present disclosure is not limited to the sequence of the described actions because according to the present disclosure, some steps may use another sequence or may be simultaneously performed. In addition, a person skilled in the art should also know that all the embodiments described in this specification are exemplary embodiments, and the related actions and modules are not necessarily required in the present disclosure.

For the convenience of a better implementation of the foregoing solutions of the embodiments of the present disclosure, the following further provides related apparatuses configured to implement the foregoing solutions.

Referring to FIG. 4-*a*, a video image processing apparatus 400 provided in an embodiment of the present disclosure may include an image obtaining module 401, an integer pixel estimation module 402, a first fractional-pixel estimation module 403, an image partitioning module 404, a first partition obtaining module 405, a second fractional-pixel estimation module 406 and a motion compensation module 407.

The image obtaining module 401 is configured to obtain a target image frame from a to-be-encoded video image.

The integer pixel estimation module 402 is configured to perform integer motion estimation on the target image frame, to obtain an optimal location obtained through the integer pixel estimation.

The first fractional-pixel estimation module 403 is configured to perform half pixel estimation on the optimal location obtained through the integer pixel estimation, to obtain an optimal location obtained through the half pixel estimation.

The image partitioning module 404 is configured to divide a surrounding area of the optimal location obtained through the half pixel estimation into four partitions.

The first partition obtaining module 405 is configured to determine, in the four partitions according to rate distortion costs respectively corresponding to four half pixel locations adjacent to the optimal location obtained through the half pixel estimation, a first partition used for quarter pixel estimation.

The second fractional-pixel estimation module 406 is configured to perform quarter pixel estimation in the first partition according to the optimal location obtained through the half pixel estimation, to obtain an optimal location obtained through the quarter pixel estimation.

The motion compensation module 407 is configured to perform motion compensation by using the optimal location obtained through the quarter pixel estimation as a motion estimation result.

In some embodiments of the present disclosure, referring to FIG. 4-*b*, the first fractional-pixel estimation module 403 includes:

a first half pixel obtaining module 4031, configured to obtain four half pixel locations adjacent to the optimal location obtained through the integer pixel estimation, the four half pixel locations being four pixel locations: directly above, directly below, directly on the left side of, and directly on the right side of the optimal location obtained through the integer pixel estimation;

a first cost calculation module 4032, configured to obtain a location corresponding to a first smallest rate distortion cost from the optimal location obtained through the integer pixel estimation and the four half pixel locations; and a first optimal location determining module 4033, configured to determine that the optimal location obtained through the half pixel estimation is the optimal location obtained through the integer pixel estimation in a case that the location corresponding to the first smallest rate distortion cost is the optimal location obtained through the integer pixel estimation.

Further, in some embodiments of the present disclosure, the first partition obtaining module 405 is specifically configured to divide a surrounding area of the optimal location obtained through the integer pixel estimation into four partitions in a case that the location corresponding to the first smallest rate distortion cost is the optimal location obtained through the integer pixel estimation, each partition including a half pixel location of the four half pixel locations.

In some embodiments of the present disclosure, referring to FIG. 4-*c*, the first fractional-pixel estimation module 403 includes:

a first half pixel obtaining module 4031, configured to obtain four half pixel locations adjacent to the optimal location obtained through the integer pixel estimation, the four half pixel locations being four pixel locations: directly above, directly below, directly on the left side of, and directly on the right side of the optimal location obtained through the integer pixel estimation;

a first cost calculation module 4032, configured to obtain a location corresponding to a first smallest rate distortion cost from the optimal location obtained through the integer pixel estimation and the four half pixel locations;

a second half pixel obtaining module 4034, configured to obtain, in a case that the location corresponding to the first smallest rate distortion cost is a first half pixel location, two half pixel locations adjacent to the first half pixel location, the two half pixel locations adjacent to the first half pixel location and the first half pixel location being located in a same axial direction, and the first half pixel location being a half pixel location with a smallest rate distortion cost in the four half pixel locations;

a second cost calculation module 4035, configured to obtain a location corresponding to a second smallest rate distortion cost from the first half pixel location and the two half pixel locations adjacent to the first half pixel location; and a second optimal location determining module 4036, configured to determine, in a case that the location corresponding to the second smallest rate distortion cost is the first half pixel location, that the optimal location obtained through the half pixel estimation is the first half pixel location; or determine, in a case that the location corresponding to the second smallest rate distortion cost is a third half pixel location, that the optimal location obtained through the half pixel estimation is the third half pixel location, the third half pixel location being a half pixel location with a smaller rate distortion cost in the two half pixel locations adjacent to the first half pixel location.

Further, in some embodiments of the present disclosure, referring to FIG. 4-*d*, the first partition obtaining module 405 includes:

a third half pixel obtaining module 4051, configured to obtain, in a case that the location corresponding to the second smallest rate distortion cost is the first half pixel location, a second half pixel location adjacent to the first half pixel location, the second half pixel location being a pixel location on which no half interpolation is performed and that is in four pixel locations: directly above, directly below, directly on the left side of, and directly on the right side of the first half pixel location; and a first area division module 4052, configured to divide a surrounding area of the first half pixel location into four partitions, each partition including one of the following four locations: the optimal location obtained through the integer pixel estimation, the two half pixel locations adjacent to the first half pixel location, and the second half pixel location.

In some embodiments of the present disclosure, referring to FIG. 4-*e*, the first partition obtaining module 405 includes:

a fourth half pixel obtaining module 4053, configured to obtain, in a case that the location corresponding to the second smallest rate distortion cost is the third half pixel location, two fourth half pixel locations adjacent to the third half pixel location, the two fourth half pixel locations being pixel locations on which no interpolation is performed and that are in four pixel locations: directly above, directly below, directly on the left side of, and directly on the right side of the third half pixel location; and a second area division module 4054, configured to divide a surrounding area of the third half pixel location into four partitions, each partition including one of the following four locations: two pixel locations that are adjacent to the third half pixel location and that are in the four half pixel locations and the two fourth half pixel locations.

In some embodiments of the present disclosure, referring to FIG. 4-*f*, the second fractional-pixel estimation module 406 includes:

a quarter interpolation module 4061, configured to perform quarter interpolation at three surrounding locations in the first partition according to the optimal location obtained through the half pixel estimation, to obtain three quarter pixel locations adjacent to the optimal location obtained through the half pixel estimation, the three quarter pixel locations being located in the first partition;

a third price calculation module 4062, configured to obtain a location corresponding to a third smallest rate distortion cost from the optimal location obtained through the half pixel estimation and the three quarter pixel locations; and a third optimal location determining module 4063, configured to determine that the location corresponding to the third smallest rate distortion cost is the optimal location obtained through the quarter pixel estimation.

It may be learned from the foregoing descriptions of the embodiments of the present disclosure that because the quarter pixel estimation in the embodiments of the present disclosure is completed in the first partition according to the optimal location obtained through the half pixel estimation, and the first partition is a partition to which a location corresponding to the smallest rate distortion cost belongs, quarter interpolation does not need to be performed in all areas during the quarter pixel estimation, and a smallest rate distortion cost of each quarter pixel location in all the areas does not need to be calculated, provided that smallest rate distortion costs of quarter pixel locations in the first partition need to be calculated. Therefore, an encoding speed can be effectively improved when video compression performance is ensured, and calculation complexity can be lowered, to lower a requirement of video compression real-time encoding for machine performance.

Figure 5:
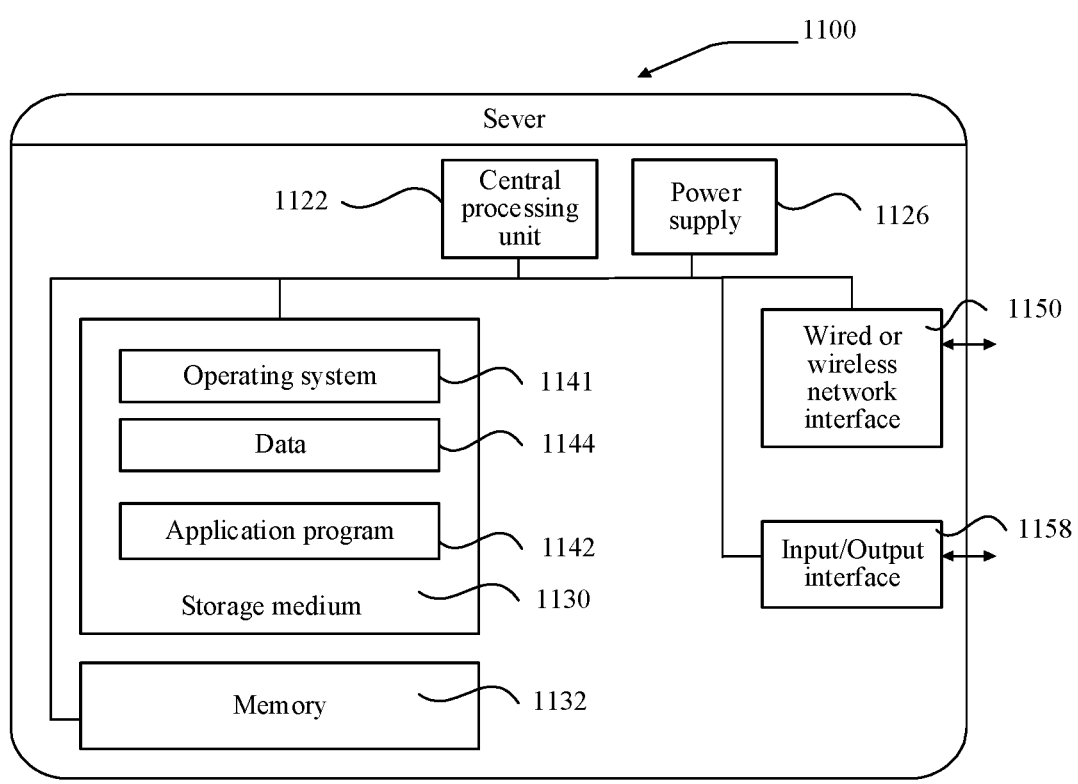
FIG. 5 is a schematic structural composition diagram of a server to which a video image processing method is applied according to an embodiment of the present disclosure.

FIG. 5 is a schematic structural diagram of a server according to an embodiment of the present disclosure. The server 1100 may vary greatly due to different configurations or performance, and may include one or more central processing units (CPU) 1122 (for example, one or more processors) and a memory 1132, and one or more storage media 1130 (for example, one or more mass storage devices) that store an application program 1142 or data 1144. The memory 1132 and the storage medium 1130 may be transient storages or persistent storages. The program stored in the storage medium 1130 may include one or more modules (which is not marked in the figure), and each module may include a series of instruction and operations for the server. Furthermore, the central processing unit 1122 may be set to communicate with the storage medium 1130, and execute, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps of the video image processing method performed by the server in the foregoing embodiments may be based on the server structure shown in FIG. 5.

Additionally, an embodiment of the present disclosure further provides a storage medium. The storage medium is configured to store program code, and the program code is used to perform the method provided in the foregoing embodiments.

An embodiment of the present disclosure further provides a computer program product including instructions. When the computer program product is run on a server, the server is caused to perform the method provided in the foregoing embodiments.

In addition, it should be noted that the described apparatus embodiment is merely exemplary. The units described as separate parts may or may not be physically separated, and parts displayed as units may or may not be physical units, may be located in one position, or may be distributed on a plurality of network units. Some or all modules thereof may be selected based on an actual requirement, to implement an objective of the solution in this embodiment. In addition, in the accompanying drawings of the apparatus embodiments provided in the present disclosure, connection relationships between modules indicate that the modules have communication connections with each other, which may be specifically implemented as one or more communications buses or signal cables. A person of ordinary skill in the art may understand and implement the objective without creative efforts.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, for the present disclosure, software program implementation is a better implementation manner in most cases. Based on such an understanding, the technical solutions of the present disclosure essentially or the part contributing to the existing technology may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present disclosure.

To sum up, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A video image processing method performed at a computing device having one or more processors and memory storing programs to be executed by the one or more processors, the method comprising:
    obtaining a target image frame from a to-be-encoded video image;
    selecting a coding tree unit including a predefined integer pixel location in the target image frame, wherein the coding tree unit has been reconstructed;
    performing deblocking and sample adaptive offset on the reconstructed coding tree unit; and
    after performing the deblocking and the sample adaptive offset on the reconstructed coding tree unit obtaining half pixel reference pixels adjacent to the predefined integer pixel location using the reconstructed coding tree unit;
    obtaining an optimal half pixel location having a minimum rate distortion cost within the reconstructed coding tree unit by:
        calculating rate distortion costs for the predefined integer pixel location and the half pixel locations;
        obtaining, in a case that a location corresponding to a first smallest rate distortion cost is a first one of the half pixel locations, two half pixel locations adjacent to the first half pixel location in a same axial direction;
        obtaining a location corresponding to a second smallest rate distortion cost from the first half pixel location and the two half pixel locations adjacent to the first half pixel location; and
        determining, in a case that the location corresponding to the second smallest rate distortion cost is the first half pixel location, that the optimal half pixel location is the first half pixel location;
    dividing a surrounding area of the optimal half pixel location into four partitions;
    selecting, among the four partitions according to rate distortion costs respectively corresponding to four half pixel locations adjacent to the optimal half pixel location, a first partition used for quarter pixel estimation;
    performing quarter pixel estimation on the first partition according to the optimal half pixel location, to obtain an optimal quarter pixel location having a minimum rate distortion cost within the first partition; and
    performing motion compensation to the target image frame by using at least one of the optimal half pixel location and the optimal quarter pixel location as a motion estimation result.

2. The method according to claim 1, wherein obtaining the optimal half pixel location comprises:
    obtaining four half pixel locations adjacent to the predefined integer pixel location, the four half pixel locations being four pixel locations: directly above, directly below, directly on the left side of, and directly on the right side of the predefined integer pixel location;
    calculating rate distortion costs for the predefined integer pixel location and the four half pixel locations; and
    determining that the optimal half pixel location is the predefined integer pixel location in a case that the predefined integer pixel location has a rate distortion cost lower than that of the four half pixel locations.

3. The method according to claim 2, wherein the dividing a surrounding area of the optimal half pixel location into four partitions comprises:
    dividing a surrounding area of the optimal half pixel location into four partitions in a case that the predefined integer pixel location has a rate distortion cost lower than that of the four half pixel locations, each partition being obtained from an area defined by the predefined integer pixel location and two of the four half pixel locations.

4. The method according to claim 1, wherein obtaining the optimal half pixel location further comprises:
    determining, in a case that the location corresponding to the second smallest rate distortion cost is one of the two half pixel locations adjacent to the first half pixel location, that the optimal half pixel location is the location corresponding to the second smallest rate distortion cost.

5. The method according to claim 1, wherein the dividing the surrounding area of the optimal half pixel location into four partitions comprises:
    obtaining, in a case that the location corresponding to the second smallest rate distortion cost is the first half pixel location, a second half pixel location adjacent to the first half pixel location, the second half pixel location being a location on which no half interpolation is performed and one selected from the group consisting of four locations including: directly above, directly below, directly on the left side of, and directly on the right side of the first half pixel location; and
    dividing a surrounding area of the first half pixel location into four partitions, each partition being obtained from an area divided by the first half pixel location, the predefined integer pixel location, the two half pixel locations adjacent to the first half pixel location, and the second half pixel location.

6. The method according to claim 4, wherein the dividing a surrounding area of the optimal half pixel location into four partitions comprises:
    obtaining, in a case that the location corresponding to the second smallest rate distortion cost is the one of the two half pixel locations adjacent to the first half pixel location, two fourth half pixel locations adjacent to the one of the two half pixel locations adjacent to the first half pixel location, the two fourth half pixel locations being pixel locations on which no interpolation is performed and that are two of the four pixel locations including: directly above, directly below, directly on the left side of, and directly on the right side of the third half pixel location; and dividing a surrounding area of the one of the two half pixel locations adjacent to the first half pixel location into four partitions, each partition being obtained from an area divided by the one of the two half pixel locations adjacent to the first half pixel location, two pixel locations that are adjacent to the one of the two half pixel locations adjacent to the first half pixel location and that are in the four half pixel locations, and the two fourth half pixel locations.

7. The method according to claim 1, wherein the performing quarter pixel estimation on the first partition according to the optimal half pixel location, to obtain an optimal quarter pixel location having a minimum rate distortion cost within the first partition comprises:

performing quarter interpolation at three surrounding locations in the first partition according to the optimal half pixel location, to obtain three quarter pixel locations adjacent to the optimal half pixel location;

obtaining a location corresponding to a third smallest rate distortion cost from the quarter pixel and the three quarter pixel locations; and determining that the location corresponding to the third smallest rate distortion cost is the optimal quarter pixel location.

8. A computing device, comprising:
one or more processors;
memory coupled to the one or more processors; and
a plurality of program instructions stored thereon, which when executed by the one or more processors cause the processors to perform operations including:
obtaining a target image frame from a to-be-encoded video image;
selecting a coding tree unit including a predefined integer pixel location in the target image frame, wherein the coding tree unit has been reconstructed;
performing deblocking and sample adaptive offset on the reconstructed coding tree unit; and
after performing the deblocking and the sample adaptive offset on the reconstructed coding tree unit obtaining half pixel reference pixels adjacent to the predefined integer pixel location using the reconstructed coding tree unit;
obtaining an optimal half pixel location having a minimum rate distortion cost within the reconstructed coding tree unit by:
calculating rate distortion costs for the predefined integer pixel location and the half pixel locations;
obtaining, in a case that a location corresponding to a first smallest rate distortion cost is a first one of the half pixel locations, two half pixel locations adjacent to the first half pixel location in a same axial direction;
obtaining a location corresponding to a second smallest rate distortion cost from the first half pixel location and the two half pixel locations adjacent to the first half pixel location; and
determining, in a case that the location corresponding to the second smallest rate distortion cost is the first half pixel location, that the optimal half pixel location is the first half pixel location;
dividing a surrounding area of the optimal half pixel location into four partitions;
selecting, among the four partitions according to rate distortion costs respectively corresponding to four half pixel locations adjacent to the optimal half pixel location, a first partition used for quarter pixel estimation;
performing quarter pixel estimation on the first partition according to the optimal half pixel location, to obtain an optimal quarter pixel location having a minimum rate distortion cost within the first partition; and
performing motion compensation to the target image frame by using at least one of the optimal half pixel location and the optimal quarter pixel location as a motion estimation result.

9. The computing device according to claim 8, wherein obtaining the optimal half pixel location comprises:
obtaining four half pixel locations adjacent to the predefined integer pixel location, the four half pixel locations being four pixel locations: directly above, directly below, directly on the left side of, and directly on the right side of the predefined integer pixel location;
calculating rate distortion costs for the predefined integer pixel location and the four half pixel locations; and
determining that the optimal half pixel location is the predefined integer pixel location in a case that the predefined integer pixel location has a rate distortion cost lower than that of the four half pixel locations.

10. The computing device according to claim 9, wherein the dividing a surrounding area of the optimal half pixel location into four partitions comprises:
dividing a surrounding area of the optimal half pixel location into four partitions in a case that the predefined integer pixel location has a rate distortion cost lower than that of the four half pixel locations, each partition being obtained from an area defined by the predefined integer pixel location and two of the four half pixel locations.

11. The computing device according to claim 8, wherein obtaining the optimal half pixel location further comprises:
determining, in a case that the location corresponding to the second smallest rate distortion cost is one of the two half pixel locations adjacent to the first half pixel location, that the optimal half pixel location is the location corresponding to the second smallest rate distortion cost.

12. The computing device according to claim 8, wherein the dividing the surrounding area of the optimal half pixel location into four partitions comprises:
obtaining, in a case that the location corresponding to the second smallest rate distortion cost is the first half pixel location, a second half pixel location adjacent to the first half pixel location, the second half pixel location being a location on which no half interpolation is performed and one selected from the group consisting of four locations including: directly above, directly below, directly on the left side of, and directly on the right side of the first half pixel location; and
dividing a surrounding area of the first half pixel location into four partitions, each partition being obtained from an area divided by the first half pixel location, the predefined integer pixel location, the two half pixel locations adjacent to the first half pixel location, and the second half pixel location.

13. The computing device according to claim 11, wherein the dividing a surrounding area of the optimal half pixel location into four partitions comprises:
- obtaining, in a case that the location corresponding to the second smallest rate distortion cost is the one of the two half pixel locations adjacent to the first half pixel location, two fourth half pixel locations adjacent to the one of the two half pixel locations adjacent to the first half pixel location, the two fourth half pixel locations being pixel locations on which no interpolation is performed and that are two of the four pixel locations including: directly above, directly below, directly on the left side of, and directly on the right side of the third half pixel location; and
- dividing a surrounding area of the one of the two half pixel locations adjacent to the first half pixel location into four partitions, each partition being obtained from an area divided by the one of the two half pixel locations adjacent to the first half pixel location, two pixel locations that are adjacent to the one of the two half pixel locations adjacent to the first half pixel location and that are in the four half pixel locations, and the two fourth half pixel locations.

14. The computing device according to claim 8, wherein the performing quarter pixel estimation on the first partition according to the optimal half pixel location, to obtain an optimal quarter pixel location having a minimum rate distortion cost within the first partition comprises:
- performing quarter interpolation at three surrounding locations in the first partition according to the optimal half pixel location, to obtain three quarter pixel locations adjacent to the optimal half pixel location;
- obtaining a location corresponding to a third smallest rate distortion cost from the quarter pixel and the three quarter pixel locations; and
- determining that the location corresponding to the third smallest rate distortion cost is the optimal quarter pixel location.

15. A non-transitory computer-readable medium having instructions stored thereon that, when executed by a computing device having one or more processors, cause the computing device to perform a plurality of operations including:
- obtaining a target image frame from a to-be-encoded video image;
- selecting a coding tree unit including a predefined integer pixel location in the target image frame, wherein the coding tree unit has been reconstructed;
- performing deblocking and sample adaptive offset on the reconstructed coding tree unit; and
- after performing the deblocking and the sample adaptive offset on the reconstructed coding tree unit obtaining half pixel reference pixels adjacent to the predefined integer pixel location using the reconstructed coding tree unit;
- obtaining an optimal half pixel location having a minimum rate distortion cost within the reconstructed coding tree unit by:
    - calculating rate distortion costs for the predefined integer pixel location and the half pixel locations;
    - obtaining, in a case that a location corresponding to a first smallest rate distortion cost is a first one of the half pixel locations, two half pixel locations adjacent to the first half pixel location in a same axial direction;
    - obtaining a location corresponding to a second smallest rate distortion cost from the first half pixel location and the two half pixel locations adjacent to the first half pixel location; and
    - determining, in a case that the location corresponding to the second smallest rate distortion cost is the first half pixel location, that the optimal half pixel location is the first half pixel location;
- dividing a surrounding area of the optimal half pixel location into four partitions;
- selecting, among the four partitions according to rate distortion costs respectively corresponding to four half pixel locations adjacent to the optimal half pixel location, a first partition used for quarter pixel estimation;
- performing quarter pixel estimation on the first partition according to the optimal half pixel location, to obtain an optimal quarter pixel location having a minimum rate distortion cost within the first partition; and
- performing motion compensation to the target image frame by using at least one of the optimal half pixel location and the optimal quarter pixel location as a motion estimation result.

16. The non-transitory computer-readable medium according to claim 15, wherein obtaining the optimal half pixel location comprises:
- obtaining four half pixel locations adjacent to the predefined integer pixel location, the four half pixel locations being four pixel locations: directly above, directly below, directly on the left side of, and directly on the right side of the predefined integer pixel location;
- calculating rate distortion costs for the predefined integer pixel location and the four half pixel locations; and
- determining that the optimal half pixel location is the predefined integer pixel location in a case that the predefined integer pixel location has a rate distortion cost lower than that of the four half pixel locations.

17. The non-transitory computer-readable medium according to claim 15, wherein the performing quarter pixel estimation on the first partition according to the optimal half pixel location, to obtain an optimal quarter pixel location having a minimum rate distortion cost within the first partition comprises:
- performing quarter interpolation at three surrounding locations in the first partition according to the optimal half pixel location, to obtain three quarter pixel locations adjacent to the optimal half pixel location;
- obtaining a location corresponding to a third smallest rate distortion cost from the quarter pixel and the three quarter pixel locations; and
- determining that the location corresponding to the third smallest rate distortion cost is the optimal quarter pixel location.

* * * * *